United States Patent [19]

Kemeny et al.

[11] Patent Number: 4,599,671

[45] Date of Patent: Jul. 8, 1986

[54] CURRENT LIMITING DEVICES UTILIZING RESISTIVE PARALLEL RAILS

[75] Inventors: George A. Kemeny, Wilkins Township, Allegheny County; Russell E. Fox, Pittsburgh, both of Pa.

[73] Assignee: Westinghouse Electric Corp., Pittsburgh, Pa.

[21] Appl. No.: 632,974

[22] Filed: Jul. 20, 1984

[51] Int. Cl.[4] .......................... H02H 9/02; H02H 9/08

[52] U.S. Cl. .......................................... 361/58; 338/13; 338/20; 338/176

[58] Field of Search ................. 361/58; 338/32 R, 13, 338/32 H, 20, 116, 118, 125, 160, 176, 177

[56] References Cited

U.S. PATENT DOCUMENTS 3,978,300 8/1976 Slade .............................. 200/144 R
4,077,025 2/1978 Slade et al. .......................... 335/16
4,347,463 8/1982 Kemeny et al. ..................... 318/135
4,433,608 2/1984 Deis et al. ................................ 89/8

*Primary Examiner*—A. D. Pellinen
*Assistant Examiner*—H. L. Williams
*Attorney, Agent, or Firm*—R. P. Lenart

[57] ABSTRACT

A current limiting apparatus is provided with a pair of generally parallel conductive rails each including an initial high conductivity portion and a more resistive portion. A sliding armature conductor is positioned between the rails and makes sliding electrical contact with the rails such that a high fault current flowing through the rails and through the armature conductor produces forces which propel the armature conductor along the rails thereby increasing the resistance through which the current flows. Final interruption of the current is accomplished by a separate circuit breaker which is connected in series with the current limiting apparatus.

27 Claims, 11 Drawing Figures

CURRENT LIMITING DEVICES UTILIZING RESISTIVE PARALLEL RAILS

BACKGROUND OF THE INVENTION

This invention relates to electrical power system protection devices and more particularly to apparatus which limits circuit current during fault conditions.

The interruption of fault currents in a high powered electrical system is a technically difficult task when fault currents can rise to hundreds of kiloamps. One common means of current interruption utilizes a massive circuit breaker to create arc voltage between separating contacts which finally exceeds the system voltage. These breakers are subject to severe breaker arc contact erosion due to long duration, high current arcing during which inductive energy of the power system is dissipated in the arc. This contact erosion by arcing can be decreased by using a secondary breaker which initially commutates the fault current into a low inductance shunt resistor thereby heating the resistor to increase its resistance and limit current. Final interruption of this reduced current is then accomplished by a primary breaker. This scheme, which is used in direct current subway and people mover systems, entails less contact damage but requires two series connected circuit breakers.

Another current interruption scheme uses the series connection of a current limiting fuse and a standard circuit breaker. In that configuration, the fuse acts to limit current and open the circuit under massive fault current conditions. For more moderate fault currents, the fuse remains intact and the circuit breaker alone performs the interruption function. Another current limiting scheme which is suitable for smaller and generally compact electrical systems involves the dropping of generator field excitation when a fault is sensed. However, instead of simply isolating the fault, the entire generating system is necessarily disabled. In addition, the response time of generator field control is slow and dangerously high fault currents may be unavoidable.

SUMMARY OF THE INVENTION

The present invention provides a current limiting apparatus which allows the safe use of relatively inexpensive circuit breakers of moderate interruption current ratings in circuits which have the potential for ultra high fault currents. A current limiting device constructed in accordance with one embodiment of this invention comprises: a pair of generally parallel conductive rails having a predetermined resistivity; a sliding armature conductor positioned between the rails and making sliding electrical contact with the rails; and means for conducting current to the rails such that current flowing through the rails and the armature conductor produces forces which propel the armature conductor along the rails thereby increasing the resistive rail length and hence the resistance through which the current flows. Various means may be provided for limiting the distance traveled by the armature conductor such that it maintains electrical contact between the rails for the duration of current flow. Resetting means may be included to return the armature conductor to its initial position between the rails following a current limiting operation. In operation, this current limiting apparatus would be connected in series with a conventional circuit breaker. By rapidly adding series rail resistance to a circuit during massive fault conditions, the fault current is limited such that final opening of the circuit by the associated breaker is accomplished at a relatively low current and therefore with little breaker contact deterioration.

The method of limiting current used by the apparatus of this invention comprises the step of: passing current through an assembly comprising a pair of generally parallel conductive rails having a preselected resistivity and a sliding armature conductor positioned between the rails and making sliding electrical contact with the rails, thereby creating an electromagnetic force which accelerates the armature conductor between the rails and increases the impedance of the assembly by increasing the length of the rails through which current flows.

DESCRIPTION OF THE PREFERRED EMBODIMENTS

Figure 1:
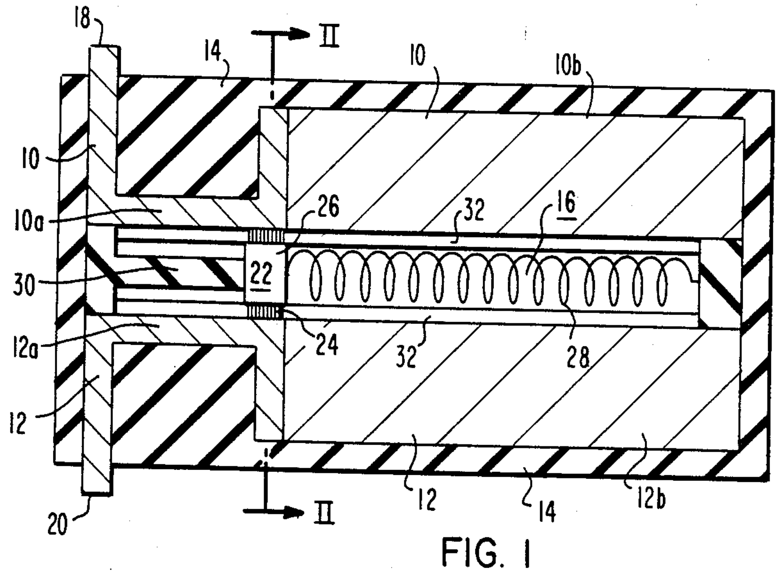
FIG. 1 is a longitudinal cross section of a current limiting device constructed in accordance with one embodiment of the present invention.

Referring to the drawings, FIG. 1 is a longitudinal cross section of a current limiting device constructed in accordance with one embodiment of this invention. The current limiter includes a pair of generally parallel conductive rails 10 and 12. Rail 10 includes a first section **10*a* having a first resistivity and a second section 10*b* having a second and higher resistivity. Similarly, conductive rail 12 includes a first section 12*a* having a first resistivity and a second section 12*b* having a second and higher resistivity. The first section of each rail has a relatively high conductivity, while the second section of each rail is made of a more resistive material. These conductive rails are restrained in an insulating support structure 14 such that a bore 16 is formed between the rails. Rails 10 and 12 extend out of support structure 14 to terminals 18 and 20 respectively which serve as means for connecting the rails to an external electrical circuit. An armature assembly 22 is positioned between the rails and may include a plurality of conductive fibers 24 and a conductive band 26** which supports the fibers.

The conductive fibers make sliding electrical contact between the rails and are initially positioned between the high conductivity rail sections 10*a* and 12*a*. In this position, the resistance of the current limiter is minimal, that is, comparable to the contact resistance of a mechanical circuit breaker.

In operation, a fault current delivered to the rails through terminals 18 and 20 passes through rail sections 10*a* and 12*a* and the armature conductor and produces an electromagnetic force which accelerates the armature conductor into the portion of bore 16 which is lined by resistive rail segments 10*b* and 12*b*. As the armature conductor passes through bore 16, the length of resistive rail segments 10*b* and 12*b* which are in the circuit increases, thereby increasing the series resistance of the current limiter and decreasing the fault current. A means for limiting the distance traveled by the armature conductor is provided in the form of a spring 28. Once current has been successfully interrupted, spring 28 provides a self-resetting function by returning the sliding armature assembly 22 to its initial position. A resilient mechanical stop 30 prevents excessive armature movement to the left and may incorporate means to safely slow down the armature when it is returned to its starting or steady state conduction position by the return spring. At its initial starting or normal position, the leading face of the armature conductor preferably closely abuts the resistive portions of the rails.

Figure 2:
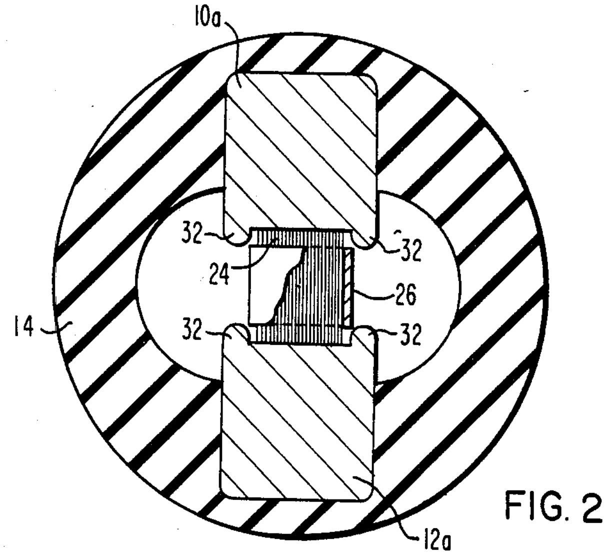
FIG. 2 is a transverse cross section of the current limiter of FIG. 1.

FIG. 2 is a cross section of the current limiter of FIG. 1 taken along line II—II. In this view, it can be seen that longitudinal protrusions 32 are included to prevent lateral movement of the armature conductor. Since the current limiter of FIGS. 1 and 2 serves only to limit current and provides no current interruption function, the resistivity of rail portions 10*b* and 12*b* may typically be in the milliohm range. For example, in a 600 volt AC circuit, a resistive rail portion impedance of about 200 milliohms should more than adequately limit the current so that it can be routinely interrupted by a conventional circuit breaker of relatively low interruption current rating connected in series with the current limiter. The advantage gained by only introducing a low initial resistance to limit the current is that high transient voltages and the resulting possibility of arcing in the current limiter are reduced and arcing can be expected to be entirely eliminated. Since heat will be dissipated in the rails during current limiting, the increase in rail resistance should be gradual and should extend over a rail length of for example a few centimeters. It is especially desirable to have a low rail resistance per unit length right near the start of the resistive rails. Since this portion of the rails will be subjected to the highest fault current magnitudes, having a low resistance per unit length at the start will both favorably limit rail voltage gradients and reduce the resistive rail temperature rise. Furthermore, by having a low rail resistance per unit length near the beginning of the resistive rail sections, after a few centimeters of armature conductor movement, enough rail mass will be included to adiabatically store the resistive heating losses without excessive overheating. Current limiter performance can be aided by allowing the armature to initially accelerate for a couple centimeters between the highly conductive rail portions 10*a* and 12*a* such that deliberate rail impedance is only introduced after the armature has attained a reasonable velocity. Then armature travel to its final point, because of the higher velocity, involves a greater rail length and therefore a greater rail mass for heat absorption. The forces produced by spring 28 should preferably result in the return of the armature to its initial starting position only after the associated series circuit breaker has opened the circuit.

Figure 3:
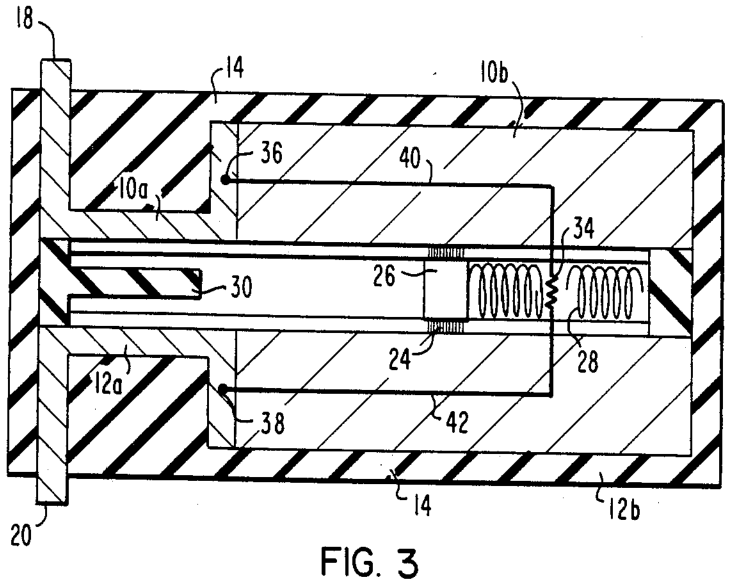
FIG. 3 is a longitudinal cross section of an alternative embodiment of the present invention.

FIG. 3 shows a cross section of the current limiter of FIG. 1 in combination with a parallel resistor. In this embodiment, a resistor 34 is connected to the highly conductive rail segments 10*a* and 12*a* at connection points 36 and 38 respectively. During a current limiting operation, as the armature travels into the portion of the bore which is lined by resistive rail segments 10*b* and 12*b*, the voltage along the rails, due to the rail resistance, commutates current into the parallel resistor 34. Resistor conductors 40 and 42 can be positioned generally parallel to resistive rail portions 10*b* and 12*b* so as to link the flux of the yet uncommutated current still flowing in the rails and armature. This high flux linkage configuration will aid in rapidly commutating the current into the parallel resistor 34.

By using a parallel resistor connection as shown in FIG. 3, the current limiter rail configuration can safely have a higher maximum resistance, since generation of high or excessive voltages in the rails is prevented by the continued current flow in the parallel resistor or resistors 34. Resistive rail heating is reduced since the heat absorption function can be substantially relegated to the parallel resistor. In addition, the resistor 34 may utilize high temperature coefficient of resistance material so as to facilitate commutation of current into the resistor while the material is still at a low temperature but to then cause a rapid resistance increase as energy is absorbed thereby increasing the resistance of resistor 34 and hastening current limiting performance. The main advantage of the FIG. 3 configuration is that it is expected to be less expensive for circuits wherein much electrical energy must be absorbed during a fault current interruption, to provide a moderately sized current limiter in combination with a parallel resistor which is sized to absorb most of the energy, rather than utilizing a massive current limiter with resistive rails large enough to provide the energy absorption function without reaching excessive temperatures.

Figure 4:
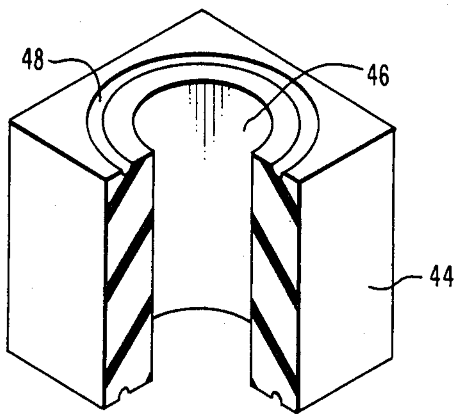
FIG. 4 is an isometric view of a liquid metal armature assembly for use in the current limiters of this invention.

FIG. 4 shows an isometric view of an alternative armature assembly wherein a liquid metal can serve as the armature conductor. In this embodiment, a cubic insulating liquid metal confining structure 44 is provided with an opening 46 for receiving the conductive liquid metal, such as sodium-potassium eutectic. An annular groove 48 is provided in one surface of the confining structure to receive an O ring that will seal against the conducting rail faces to prevent any leakage of the liquid metal armature conductor. A similar O ring groove is also provided in the opposite face of the liquid metal confining structure 44.

Figure 5:
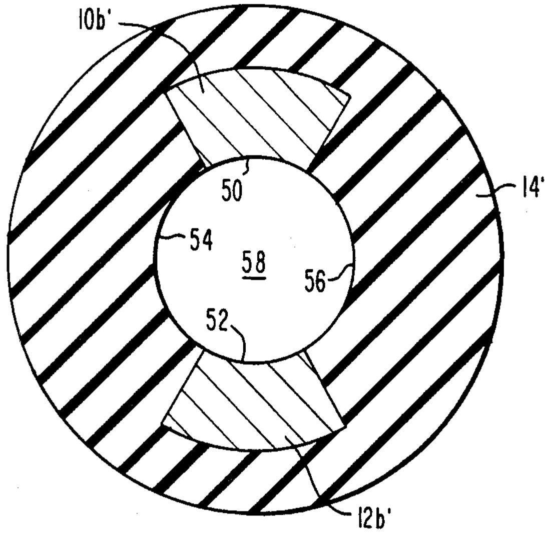
FIG. 5 is a transverse cross sectional view of an alternative rail arrangement for use in this invention.
Figure 6:
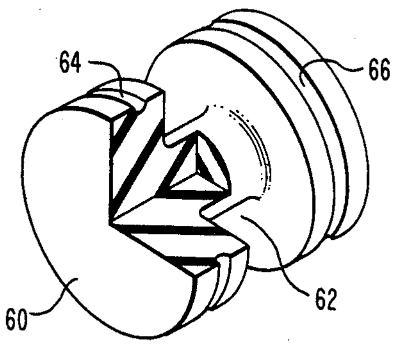
FIG. 6 is an isometric view of an alternative liquid metal armature conductor assembly.

FIG. 5 is a transverse cross section of an alternative embodiment of this invention which is suitable for use with a liquid metal armature conductor. In this embodiment, resistive rail segments 10*b*' and 12*b*' include an arcuate inner surface 50 and 52 respectively. These surfaces combine with arcuate inner surfaces 54 and 56 of restraining structure 14' to produce a cylindrical bore 58. FIG. 6 shows an isometric view of a cylindrical or spool-type liquid metal confining structure 60 having an annular groove 62 for receiving the conductive liquid metal. Additional annular grooves 64 and 66 are provided to receive bore sealing O rings which prevent leakage of the liquid metal.

Figure 7:
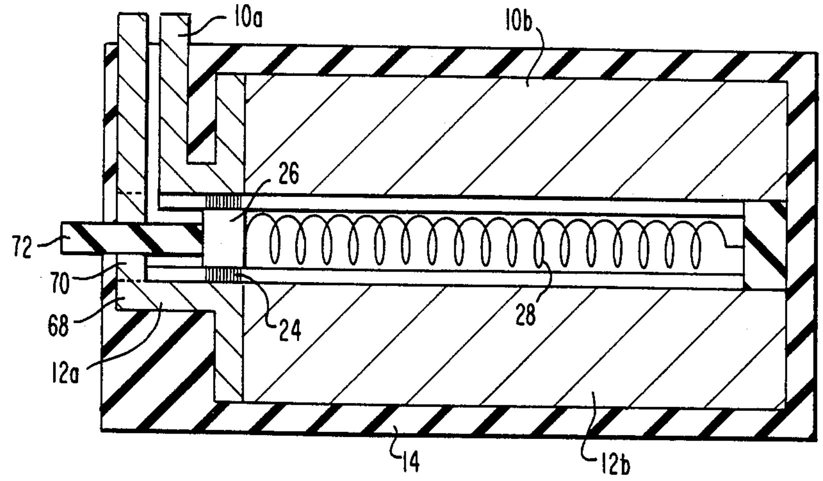
FIG. 7 is a longitudinal cross section of an alternative embodiment of this invention wherein the conductors provide initial electromagnetic force augmentation behind the armature conductor.
Figure 8:
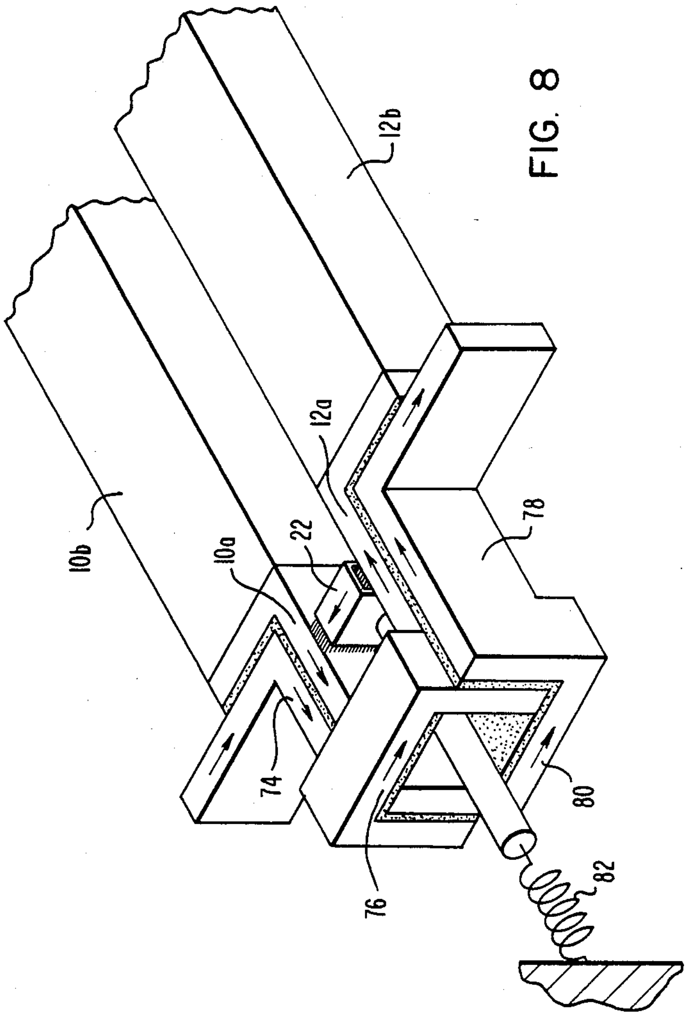
FIG. 8 is an isometric view of an alternative augmentation scheme for use with the limiters of the present invention.

FIGS. 7 and 8 show current limiter rail configurations which are designed to increase the initial acceleration of the armature conductor by augmenting the magnetic field behind the armature conductor. In FIG. 7, the highly conductive segment 12*a* of rail 12 includes a right angle bend 68 such that a portion of the rail 70 will conduct current in a direction which is parallel and opposite to the direction of current flow through the armature. This results in an initial acceleration force which is somewhat higher than the force produced in the configuration of FIG. 1 and therefore yields a higher initial acceleration of the armature conductor. However, after the armature has traveled a couple of bore widths from the point where the current feeds the parallel rails, the acceleration forces in the FIG. 7 configuration are approximately equal to the forces in the FIG. 1 configuration. In FIG. 7, an insulating arresting bar 72 is shown to pass through rail segment 70 and may be used to first resiliently stop and then reset the armature to its initial position following a current limiting operation.

FIG. 8 shows an embodiment of this invention which includes additional augmenting conductors positioned adjacent to the high conductivity rail segments 10*a* and 12*a* and connected such that current flows in the same direction in each augmentation conductor and its adjacent high conductivity rail segment. In FIG. 8, the arrows indicate the direction of current flow and augmenting conductor 74 is seen to be positioned adjacent to rail segment 10*a* and is connected to rail segment 12*a* by way of shunt 76. Similarly, augmenting rail 78 is positioned adjacent to rail segment 12*a* and is connected to rail segment 10*a* by way of shunt 80. Current flow through these augmenting conductors and shunts enhances the initial accelerating force by increasing the bore flux density behind the armature, that is, the vector cross product of current density and magnetic flux density, $J \times B$, acceleration force is increased. The configuration of FIG. 8 can be expected to increase the initial accelerating force by a factor of about four or more when compared to the configuration of FIG. 1. FIG. 8 also shows a spring 82 which can be used to return the armature to its initial position following a current limiting operation.

Figure 9:
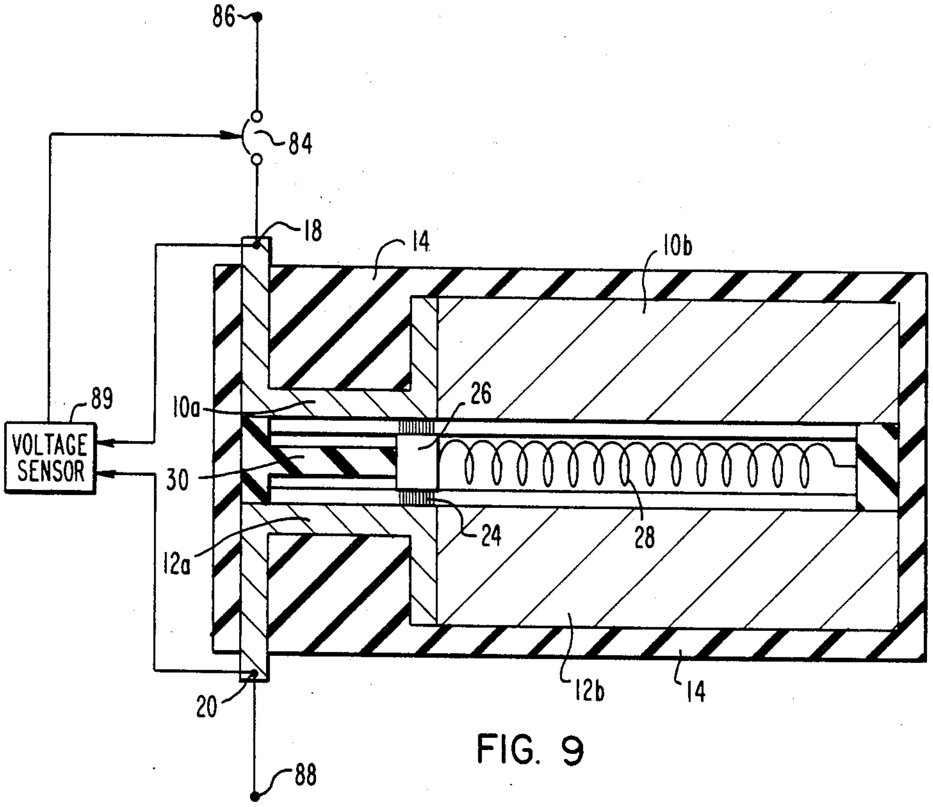
FIG. 9 is a schematic diagram of a current interruption circuit which includes the series connection of a current limiter and a conventional circuit breaker.

FIG. 9 shows the current limiter of this invention connected in series with a conventional circuit breaker 84 to form a circuit interrupting system between terminals 86 and 88. A voltage sensor 89 senses voltage between rail terminals 18 and 20. When a current limiting operation occurs, the voltage between the rail terminals increases and voltage sensor 89 produces a signal which actuates breaker 84 to interrupt the current. It should be understood that resistive rail segments 10*b* and 12*b* may have either a constant or variable resistance per unit length in order to achieve the desired operating characteristics of the current limiter.

Figure 10:
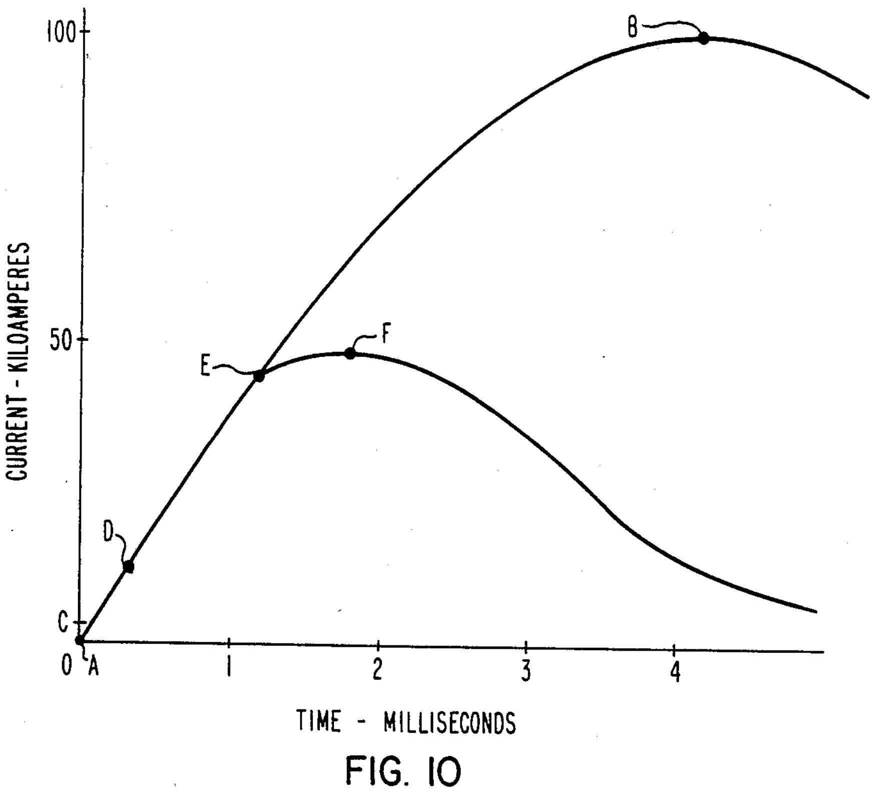
FIG. 10 is a graph which illustrates the operation of the present invention.

FIG. 10 shows a calculated current curve which illustrates a typical current limiting performance of the present invention. For simplicity of explanation, it is assumed that the short circuit condition was initiated at point A and that in the absence of current limiting, the 60 Hz. current would attain peak magnitude of 100 kiloamps at point B. The operating current level is assumed to be 3000 amperes peak as indicated at point C. The sliding armature conductor 22 as shown in FIG. 1 is held and restrained in its normal high conductivity rail position by spring 28 and stop 30. At normal operating currents, the armature acceleration forces are deliberately far too low to cause any armature movement. Alternatively, the system may be designed to allow for some slight armature vibration which may assist in maintaining low contact resistance between the armature and the rails. The restraints on armature movement are deliberately set so that at some particular threshold current level, for example, at a level of 12,000 amperes as indicated by point D, the acceleration forces will exceed the restraining forces and the armature acceleration then commences. It should be observed that armature acceleration is proportional to current squared and therefore if the threshold current is four times the operating current peak value as in this example, then the threshold accelerating force will be sixteen times the peak force which is experienced by the armature during rated current operation. Thus, at rated current conditions, the force on the armature is quite small compared to the force which will commence armature movement under a fault condition. In this mode of operation, the circuit breaker 84 in FIG. 9 is expected to always interrupt moderate fault currents after a few or many cycles of fault current duration. For massive fault current conditions wherein the fault current rises above the threshold current level of the current limiter, the current limiter very rapidly reduces the current level and the circuit breaker thus only interrupts a few cycles later at a moderate current level.

In the massive fault scenario of FIG. 10, absent current limiting, the fault current would attain, for example, 100 kiloamps and a breaker would then have to interrupt this current a few cycles later after substantial arc damage associated with arcing at such high current levels. With current limiting, the armature conductor will commence movement at its threshold current level, point D, and in the order of a millisecond later at point E, the total armature conductor will be in the resistive rail sections since the rear conducting portion or face of the armature conductor will just have passed beyond the high conductivity rail sections, and current limiting will start. Depending upon the initial rail resistance per unit length and the armature velocity, the peak current will now be limited to a magnitude such as that illustrated at point F and thereafter, as armature motion adds rail resistance, the fault current will rapidly decrease to the point where the armature has reached its maximum travel distance. If the armature is temporarily restrained at this maximum distance and maximum resistance position, the fault current level will be reduced as desired, for example, to a few kiloamperes, and a few cycles later, this fault current must absolutely be interrupted by the breaker since otherwise, overheating of the resistive rail portions of the current limiter would occur.

In the above scenario, the breaker and its instrumentation which senses fault conditions will have been subjected to a single moderate current excursion, that is, to the peak current value illustrated by point F. After reaching this peak value, the fault current may have been reduced by current limiting all the way to near rated operating current level. This brief current excursion with normal breaker instrumentation may not be enough to assure that breaker opening is initiated. Therefore, as shown in FIG. 9, a voltage sensor 89 in the form of a relay coil or other instrumentation may be connected across terminals 18 and 20 in order to sense voltage across the current limiter. Very soon after the sliding armature conductor fully enters the resistive rail portion, near to full system voltage will appear across the current limiter and the voltage sensing instrumentation or the relay must signal the breaker to initiate current interruption. Actual breaker contact opening will then occur a few cycles later, at a very moderate current level and hence with little contact erosion. Actually, current interruption could at this point be accomplished with a contactor rather than a breaker.

The curves of FIG. 10 can also be used to better explain why it is desirable to increase the initial sliding armature conductor acceleration force, for example, by using the configurations of FIGS. 7 and 8. The sliding armature conductor must have sufficient cross-sectional area and mass so as not to overheat at rated current conditions. Actually, rated operating current conditions and the associated temperature rise will determine the armature mass since the additional armature temperature rise during current limiting will be quite small because there is only a single short duration high current peak. Examining FIGS. 1, 7 or 9, it can be seen that current limiting essentially starts only after the sliding armature has travelled a distance approximately equal to its own length and has thereby fully entered the resistive rail bore portion. A higher initial accelerating force will result in a faster armature traverse, thereby lowering the fault current value at point E in FIG. 10. The peak let-through fault current at point F will also be lowered. Therefore, the armature should traverse its own length as fast as possible. However, once current limiting has started at point E with the armature now travelling at, for example, 50 meters per second, there is little advantage in further acceleration as this will only make stopping the armature more difficult. Therefore, the acceleration augmentation schemes of FIGS. 7 and 8 only augment the acceleration force for the initial few centimeters of bore length.

In FIGS. 1, 7 and 9, the sliding armature is shown in its normal operating position wherein the armature is shown to short across the high conductivity portions of the current limiter rails. The high conductivity rail sections will generally be copper and may be partially silver plated to further lower and maintain low contact resistance at the location of the armature electrical contact areas. Thus, at normal operating conditions, a high conductivity armature which may include numerous high conductivity metal fibers, brushes or liquid metal, shorts between the high conductivity rail sections such that the total resistance between these sections consists of only two contact resistances on opposite ends of the armature plus the electrical resistance of the armature itself. Calculations have shown that for operating currents of about 2500 amperes rms, the resistance between the high conductivity rails and and a metal fiber or liquid metal armature would be in the order of 10 micro ohms. Such a minimal resistance is highly favorable to reduce contact heat losses. Actually, this contact impedance is about the same as for circuit breaker contacts designed for the same operating current levels.

In FIG. 10, the current limiting apparatus performance was illustrated with respect to one phase of a 60 Hz. system. In a three-phase AC system, a current limiting apparatus would be series connected into each of the three phases. FIG. 10 illustrates that for most effective alternating current operation, current limiting must be initiated very rapidly after fault inception, for example, in about 1 millisecond, so that fault current is limited to a magnitude well below the prospective peak value which would occur absent the current limiter. An alternative approach is to have a slower acting current limiter in which case, the first fault current peak may actually occur but current limiting will prevent successive peak currents of high magnitude. In this case, the circuitry will be subjected to one massive fault current excursion, but by the time the breaker operates, current will be low enough to reduce breaker contact deterioration. One disadvantage of this slower current limiter action is that system components will be subjected to a single pulse of very high electromagnetic forces associated with fault currents which may be in the 100 kiloampere range.

As shown in FIG. 10 for a 60 Hz. alternating current system, computer solutions indicate that current limiting can readily be initiated in the order of a millisecond after fault initiation. In a direct current system, the initial rate of rise of fault current can be expected to be comparable or more likely slower than that indicated in FIG. 10. Under DC conditions, the current limiter will similarly reduce the prospective peak current level which would be generated absent the current limiter. Thereafter, an additional circuit series resistance increase as the armature traverses the resistive rail bore will again produce further current reduction. Thus, the current limiters of this invention are equally applicable to alternating and direct current systems to prevent excessive fault current magnitudes.

Figure 11:
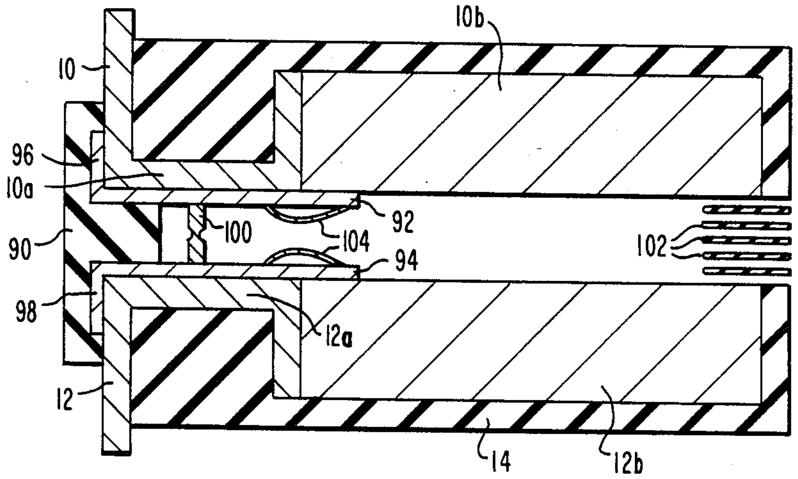
FIG. 11 is a longitudinal cross section of another alternative embodiment of this invention which includes a replaceable fuse assembly.

FIG. 11 shows a longitudinal cross section of a current limiting apparatus constructed in accordance with an alternative embodiment of the present invention. In this embodiment, a replaceable fuse assembly 90 is used in combination with the parallel resistive rails 10*b* and 12*b* to achieve rapid current limiting. The fuse assembly 90 includes a pair of fuse rails 92 and 94 which are inserted into the bore formed by parallel rails 10 and 12 and make electrical contact along contact portions 96 and 98. Under normal operation, current flows through a portion of rail 10, fuse rail 92, fuse element 100, fuse rail 94 and a portion of rail 12. Under fault current conditions, the fuse element 100 explodes and forms an arcing path which is rapidly accelerated between fuse rails. This rapid acceleration causes a rise in impedance and current limiting due to both the voltage drop of the arc itself and the voltage drop of the resistive rail portions. The rail bore terminates in a chute structure 102 which interrupts the arc during a current zero. Since current contact to the rails is by arcing, the rails may be divergent thus resulting in more space for the arc chute structure and a higher arc voltage. In addition, the moving arc involves a very low mass plasma, so that arc acceleration and final arc velocity will be vastly higher than the armature speeds obtained in the previously described current limiters. This may in turn result in inductance generated voltages well above normal system voltage during the current limiting sequence. To prevent damage due to such excessive voltage spikes, the replaceable fuse cartridge may additionally include a spark gap 104 having a spacing such that in the case of excessive voltage, breakdown will occur at this preferred location and the arc will then again travel into the arc chute to be extinguished. In the configuration of FIG. 11, damage due to arcing should be substantially confined to the replaceable fuse cartridge and the bore restriction introduced by spark gap 104 may help to confine fuse debris. The more extensive damage in the replaceable fuse cartridge will be caused by fuse materials and arc hesitation, that is, relatively slow initial arc movement. By the time the arc emerges to contact the resistive portions of the parallel rails, arc velocity should be sufficient to prevent undesired rail deterioration. By the time the arc reaches the chute, the current should be limited to a magnitude which is low enough to reduce chute area deterioration to acceptable levels. The resistive portions of the parallel rails may be constructed of carbides or other carbonaceous materials which have excellent arc damage resisting properties. Such carbides or carbonaceous materials are also highly suitable for the resistive rails of current limiters which use sliding armatures since these materials have high specific heat values and excellent performance at high temperatures and at high temperature gradients.

It should be observed that the electromagnetic forces which propel a conducting armature located between a parallel rail pair which is straight and unbending exist similarly if the rail pair involves curvature. All that is necessary is that the propellable armature be suitably restrained so that in its traverse, it remains between the rails and continues to provide the electrical connection between the rails. Furthermore, even though all illustrations show two opposing resistive rail portions, it should be understood that the current limiter is also operable with one resistive rail and one rail which is highly conductive over the whole length of propellable armature traverse. Such a configuration, though operable, is considered inferior because for a given propellable armature traverse, the voltage gradient in the resistive rail will be doubled and all heat absorption will be concentrated in one resistive rail only, which is less desirable.

Although the present invention has been described in terms of what are at present believed to be its preferred embodiments, it will be apparent to those skilled in the art that various changes may be made without departing from the scope of the invention. It is therefore intended that the appended claims cover all such changes.

What is claimed is:

1. A current limiting apparatus comprising:

a pair of conductive rails;

a terminal connected to each of said rails for connecting the current limiting apparatus to an external electrical circuit; and a propellable armature conductor which is connected to conduct current flowing through said current limiting apparatus such that under normal operating conditions, said armature conductor remains substantially stationary and presents a minimal apparatus impedance to said external circuit and such that under fault current conditions, said armature conductor is electromagnetically propelled by the fault current into a resistive portion of said rails thereby adding circuit impedance to limit the fault current magnitude.

2. A current limiting apparatus as recited in claim 1, wherein said conductive rails each include a highly conductive section and under normal operating conditions, said armature conductor is positioned to short between the highly conductive sections of said rails.

3. A current limiting apparatus as recited in claim 2, further comprising:

means augmenting the accelerator force on said armature conductor which is generated by current flowing through said armature conductor and through said highly conductive section of said rails.

4. A current limiting apparatus as recited in claim 3, wherein said accelerating force augmenting means comprises:

a bend in one of said rails such that current flow in a portion of said bent rail is in a direction that is opposite and substantially parallel to the direction of current flow through said armature conductor.

5. A current limiting apparatus as recited in claim 3, wherein said accelerating force augmenting means includes:

a first augmenting conductor lying generally parallel to at least a portion of a first one of said rails and connected to conduct current in the same direction as current flows in said first rail; and a second augmenting conductor lying generally parallel to at least a portion of a second one of said rails and connected to conduct current in the same direction as current flows in said second rail.

6. A current limiting apparatus as recited in claim 3, wherein said accelerating force augmenting means primarily augments the accelerating force between said highly conductive sections of said rails.

7. A current limiting apparatus as recited in claim 1 wherein under normal operating conditions, said armature conductor is subjected to electromagnetic forces which are insufficient to initiate armature movement.

8. A current limiting apparatus as recited in claim 1, further comprising:

means restraining said armature conductor in its normal operating position.

9. A current limiting apparatus as recited in claim 8, wherein when the fault current exceeds a preselected threshold current level, electromagnetic armature conductor acceleration forces exceed restraining forces applied by said armature restraining means and armature acceleration commences.

10. A current limiting apparatus as recited in claim 1, wherein when under fault current conditions the current exceeds a preselected threshold level, armature conductor acceleration is directly produced.

11. A current limiting apparatus as recited in claim 1, further comprising:

means for limiting the distance traveled by said armature conductor and maintaining electrical contact between said armature conductor and said rails for the duration of current flow.

12. A current limiting apparatus as recited in claim 1, wherein said armature conductor comprises:

a plurality of conductive metal fibers contacting said rails.

13. A current limiting apparatus as recited in claim 1, futher comprising:

means for self-resetting said armature conductor to its normal position following a current limiting operation.

14. A current limiting apparatus as recited in claim 1, further comprising:

a resistor electrically connected in parallel with said armature conductor.

15. A current limiting apparatus as recited in claim 14, wherein said conductive rails each include a highly conductive section and said resistor is connected between said highly conductive rail sections.

16. A current limiting apparatus as recited in claim 15, wherein each end of said resistor is connected to a conductor which is connected to the highly conductive section of one of said rails, and said conductors are positioned to link magnetic flux created by current flowing in said rails.

17. A current limiting apparatus as recited in claim 14, wherein said resistor increases in resistance upon being heated by current flow, thereby providing additional current limiting.

18. A current limiting apparatus as recited in claim 1, wherein said armature conductor comprises:

a liquid metal confining structure having an opening for receiving conductive liquid metal, said liquid metal making electrical contact with each of said rails.

19. A current limiting apparatus as recited in claim 18, wherein said liquid metal confining structure is a cube of insulating material and said opening is a cylindrical bore through said cube.

20. A current limiting apparatus as recited in claim 1, further comprising:

an insulating support structure shaped to receive said rails and having arcuate surfaces adjacent to a gap between said rails, wherein the surface of each of said rails adjacent to said gap is arcuate such that a cylindrical bore is formed between said rails and the arcuate surfaces of said support structure; and wherein said armature conductor comprises a cylindrical slug having an annular groove for receiving conductive liquid metal, such that said liquid metal makes contact with said rails and is restrained in said slug by a sealing means.

21. A current limiting apparatus as recited in claim 1, further comprising:

means for sensing voltage across said current limiting apparatus terminals; and means responsive to said means for voltage sensing for interrupting current flow.

22. A current limiting apparatus as recited in claim 1, further comprising:

an insulating structure enclosing said rails.

23. A current limiting apparatus as recited in claim 22, wherein said insulating structure is hermetically sealed.

24. A current limiting apparatus as recited in claim 1, wherein said resistive portion of said rails includes a carbonaceous material.

25. A current limiting apparatus as recited in claim 1, further comprising:

means for guiding said armature conductor along said rails.

26. A current limiting apparatus as recited in claim 1, wherein the leading edge of said armature conductor is initially positioned adjacent to one end of said resistive portion of said rails.

27. A current limiting apparatus as recited in claim 1, further comprising:

a removable fuse assembly positioned between said rails and having a fuse element electrically connected between said rails such that at a predetermined current magnitude, said fuse explodes and forms a plasma which serves as said armature conductor.

* * * * *